J. L. HATCH.
Counter-Stiffenings for Boots and Shoes.

No. 146,252.          Patented Jan. 6, 1874.

Witnesses.
Henry M. Thomas
Henry S. Redfield

Inventor.
James L. Hatch,
pr R. F. Osgood,
atty.

UNITED STATES PATENT OFFICE.

JAMES L. HATCH, OF ROCHESTER, NEW YORK.

IMPROVEMENT IN COUNTER-STIFFENINGS FOR BOOTS AND SHOES.

Specification forming part of Letters Patent No. 146,252, dated January 6, 1874; application filed June 30, 1873.

*To all whom it may concern:*

Be it known that I, JAMES L. HATCH, of the city of Rochester, in the county of Monroe and State of New York, have invented a certain new and useful Improvement in Boot and Shoe Counters or Stiffenings; and I do hereby declare that the following is a full, clear, and exact description of the construction and operation of the same.

Figure 1:
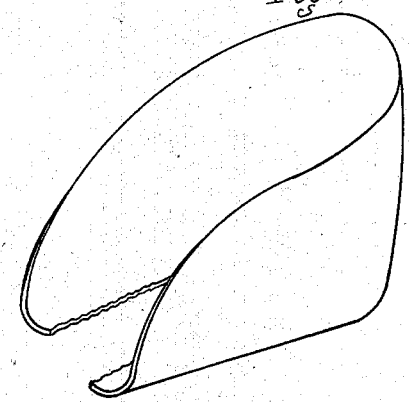
Figure 2:
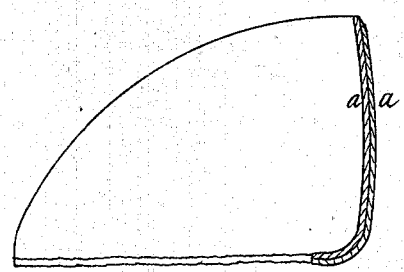
Figure 3:
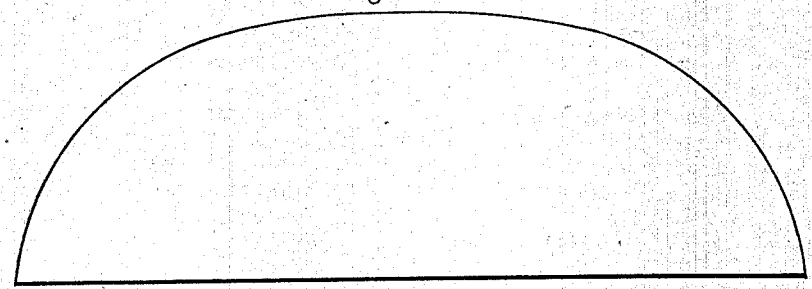

In the drawings, Figure 1 is a perspective view of my improvement. Fig. 2 is a section; Fig. 3, a view of the flat stiffening.

In forming boot and shoe counters it is customary to make them in two or more layers to get the proper body or consistency, and these layers are united by a cement of some kind to hold them together. This cement has been made of paste in which glue enters as a component part. The use of glue is objectionable for several reasons, the most important of which are that, when dry, it is exceedingly hard and brittle, and imparts these qualities to the counter itself, rendering it very stiff and unyielding, and difficult to fit in place; furthermore, in crimping or forming the counter, it has to be soaked to soften it, and the paste will not adhere. Another objection still is that, in wear, when the counter becomes wet, the paste will dissolve, thus separating the layers and causing them to break down, bend, or become an impediment to the wearer, besides spoiling the appearance of the heel of the boot or shoe.

To obviate these defects is the object of my invention; and it consists in the production of a water-proof counter for boots or shoes made of two or more layers of leather, which are united together by a solution of benzine and rubber, thus creating between each an elastic and pliable film in such a manner that a counter is produced for the market possessing, in an eminent degree, the requisite degree of rigidity and elasticity as to render it pliable and yielding; and so evenly and uniformly does it partake of and retain these qualities that, when applied to a boot or shoe, it will, with slight wear, assume the contour or shape of the wearer's heel; and, further, the parts are incapable of being disconnected, rumpled, or puckered during wear, either by the motion of the wearer's heel, or the action of perspiration or water.

The drawings show a counter or stiffening of ordinary form, which may be crimped, molded, or otherwise formed into the desired shape. It may be composed of two or more layers or thicknesses, *a a,* laid one over the other and united by the cement, and may be made of any material or combination of different materials —such, for instance, as leather, leather-board, &c. I first cut the layers of proper form from the sheet or from pieces, and lay them one over another, with the cement between, which is spread by a brush or other appliance. The parts thus united are passed through the crimping or other apparatus and pressed into form, no wetting or soaking, such as is usually required, being necessary. The cement consists simply of rubber and benzine, or its equivalent product of the distillation of petroleum.

The advantages of this arrangement are as follows: The parts are cemented more perfectly than by the use of ordinary pastes, and a perfectly elastic film is embedded between the layers, which imparts a corresponding elasticity to the whole counter, rendering it thereby pliable, yielding, and easily fitted in place by the workman; and these qualities it never loses, even in long wear. At the same time the stiffening retains all its strength and ability to maintain form, thereby forming a perfect stiffening. By reason of its pliability and yieldingness it is also much easier to the wearer, and will last much longer. Another important advantage is that rubber is insoluble in water, and is therefore water-proof, and never becomes soaked so as to break down; whereas the ordinary pastes are soluble, and, when wet, lose all their valuable properties, allowing the layers to separate, and the counter thus to lose its stiffness and form. Another important advantage is, that at the time of application the benzine, which is very penetrating, strikes deep into the pores of the layers and quickly renders the layers as soft and pliable as when long soaked in water, and thereby avoids the necessity of soaking before crimping. This is of the utmost importance in making leather-board stiffenings, which usually require some hours soaking before they can be crimped, and even then are not easily turned at the bend without breaking. By the use of my improvement I can form such material into stiffenings without trouble, and without breaking, as the material becomes so pliable by the action of the fluid as to be turned or bent in any desired shape. This process overcomes the objection now made to leather-board stiffenings, by rendering them permanently elastic and pliable.

By this process scraps and waste pieces of leather may be employed, thus making a great saving to manufacturers. In the old process of pasting, such scraps and waste pieces could not be well used, for the reason that they would not adhere well or make a good stiffening. Such stiffenings have heretofore been made from the whole sheet or side of leather.

I deem it proper to again reiterate and explain that counters made of two or more layers of leather connected by paste are inefficient for their office, since the paste, on becoming hard, cracks and peels; and, further, its presence imparts too great a rigidity to the counters, so much so that they are deprived of the requisite pliability and elasticity, and the consequence of such is that each layer must be separately crimped or formed prior to being pasted together, for, if they be soaked after being pasted together for crimping or forming, they become moist and disconnected.

By my invention the counter can, and is intended to, be crimped or formed when the layers are united by the elastic and water-proof film, for I dispense with all soaking, as the action of the elastic film is such as to permeate all the pores of the layers composing the counter, and renders the entire counter soft and pliable and specially adapted for the mechanical operation of crimping or forming; and, further, should it ever be desired to soak my improved counter prior to crimping or forming, it can be accomplished without the slightest danger of detaching the parts, since the counter is made water-repellent or water-proof.

Having thus described my invention, I do not claim, broadly, uniting the layers of a boot or shoe counter by paste; neither do I claim a counter for boots or shoes made of two layers or thicknesses of leather or other material; nor do I claim a cement of caoutchouc, naphtha, and sulphur, for such, of themselves, are old and well known; but

What I claim as new is—

A counter for boots or shoes consisting of two or more layers of leather or leather-board connected together by the water-repellent compound or film herein described, for rendering the counter water-proof, elastic, and pliable, as and for the purpose herein specified.

In witness whereof I have hereunto signed my name in the presence of two subscribing witnesses.

JAMES L. HATCH.

Witnesses:
   THOMAS E. BARTLETT,
   CHAS. B. HATCH.